United States Patent [19]

Schwartz

[11] 4,265,787
[45] May 5, 1981

[54] CRACKING CATALYST

[75] Inventor: Albert B. Schwartz, Philadelphia, Pa.

[73] Assignee: Mobil Oil Corporation, New York, N.Y.

[21] Appl. No.: 897,077

[22] Filed: Apr. 17, 1978

Related U.S. Application Data

[63] Continuation of Ser. No. 642,884, Dec. 22, 1975, which is a continuation-in-part of Ser. No. 399,008, Sep. 20, 1973, abandoned, and a continuation of Ser. No. 440,890, Feb. 4, 1974, abandoned.

[51] Int. Cl.² ............................................. B01J 29/06
[52] U.S. Cl. .................................... 252/455 Z; 208/120
[58] Field of Search ....................... 252/455 Z; 208/120

[56] References Cited

U.S. PATENT DOCUMENTS

| | | | |
|---|---|---|---|
| 2,436,927 | 3/1948 | Kassel | 252/417 |
| 2,647,860 | 8/1953 | Plank et al. | 208/120 |
| 3,364,136 | 1/1968 | Chen et al. | 208/120 |
| 3,650,990 | 3/1972 | Frilette et al. | 252/454 |
| 3,660,310 | 5/1972 | Kluksdahl | 252/455 Z |
| 3,718,553 | 2/1973 | Stover | 208/120 |
| 3,788,977 | 1/1974 | Dolbear et al. | 208/120 |

Primary Examiner—Carl F. Dees
Attorney, Agent, or Firm—Charles A. Huggett; Michael G. Gilman; Vincent J. Frilette

[57] ABSTRACT

Operation of regenerators of commercial equipment for catalytic cracking of hydrocarbon feedstock, such as gas oil, in the absence of added hydrogen is improved considerably by use of a cracking catalyst which contains a minute amount, as low as fractions of a part per million (ppm), of a metal from periods 5 and 6 of Group VIII of the Periodic Table or rhenium. These powerful dehydrogenation metals, in the amounts here used, do not have serious adverse effect on the cracking operation and reduce CO content of flue gases from the regenerator to negligible amounts.

28 Claims, No Drawings

CRACKING CATALYST

CROSS-REFERENCE TO RELATED APPLICATIONS

This application is a continuation of U.S. application Ser. No. 642,884 filed Dec. 22, 1975, which in turn is a continuation-in-part of application U.S. Ser. No. 399,008, filed on Sept. 20, 1973, and a continuation application U.S. Ser. No. 440,890, filed Feb. 4, 1974, both abandoned.

BACKGROUND OF THE INVENTION

1. Field of the Invention

The invention is concerned with improving operations in cracking of hydrocarbons in the absence of added hydrogen. Characteristically, commercial equipment for this purpose involves a cracking reactor and a regenerator with continuous circulation of catalyst through the two vessels. Particularly significant advantages are achieved in Fluid Catalytic Cracking (FCC) with zeolitic catalyst. The invention has no applicability to hydrocracking using a fixed bed of catalyst and an excess of added hydrogen.

2. Discussion of the Prior Art

Two general types of catalytic cracking process are currently in commercial use. Thermofor Catalytic Cracking (TCC) uses a moving compact bed of catalyst in both reactor and regenerator. Catalyst which has become relatively inactive by deposition of a carbonaceous deposit commonly called "coke" is continuously withdrawn from the bottom of the reactor in which gas oil is cracked by contact with the catalyst at elevated temperature. The spent catalyst from the reactor is passed to the top of a regenerator in which activity of catalyst is restored by burning the coke in air. Hot regenerated catalyst from the bottom of the regenerator is continuously returned to the top of the reactor to repeat the cycle first described.

In Fluid operations, the catalyst follows a similar circulation but is "fluidized" in both reactor and regenerator by upwardly flowing gases in each, hydrocarbon vapor in the reactor and in the regenerator.

The major difference in catalyst for the two processes is particle size. Pellets or beads of about ⅛" diameter are employed in TCC. Fine powders, with an average particle size of about 70 microns, are used in FCC.

Both types of process are operated at pressures from atmospheric to about 40 psig. Hydrogen is produced in small amounts by the cracking reaction, but no hydrogen is added as such to the reactors of TCC and FCC Units. This cracking in the absence of added hydrogen is endothermic, as contrasted with the exothermic character of hydrocracking with a catalyst which contains significant amounts of hydrogenation metal (upwards of 0.5 wt. %) and in the presence of large excess of added hydrogen, as described in U.S. Pat. No. 3,173,854.

In general, potent hydrogenation metals are avoided in TCC and FCC catalysts. A serious problem for these catalysts is recognized in cracking of stocks which contain metals. Particularly disadvantageous is deposition of the Group VIII metal nickel. Amounts of nickel on the order of 0.03 wt. % on catalyst will increase the hydrogen make to a level which causes severe problems in handling of the dry gas from TCC and FCC operations.

The catalysts employed in FCC and TCC have included acid treated clays, amorphous silica-alumina composites and the like. Many variants, such as silica-zirconia, silica-magnesia and other acidic porous solids have been described in the literature.

More recently, very effective catalysts have been prepared by blending a major portion of the older amorphous catalysts with a minor portion of an active crystalline aluminosilicate zeolite. Typical catalysts of this type for FCC and TCC are described in U.S. Pat. Nos. 3,140,249 and 3,140,253, the disclosures of which are hereby incorporated by reference.

In FCC and TCC a problem arises from incomplete combustion, leaving a significant amount of carbon monoxide (CO) in the flue gas. Aside from the undesirability of discharge of CO to the atmosphere, such flue gases tend to burn (by reaction of CO with residual oxygen in the flue gas) in ducts and flues of the plant, damaging these structures by excessive temperatures.

It has been proposed to alleviate the CO problem in TCC by adding a small amount of chromic oxide to the catalyst. This causes some impairment of gasoline yield, but that effect is tolerable in combatting the CO problem. See U.S. Pat. No. 2,647,860.

SUMMARY OF THE INVENTION

A minute quantity of a metal or metals from Periods 5 and 6 of Group VIII of the Periodic Table and rhenium or their compounds is added to a cracking catalyst for use in cracking hydrocarbon feedstocks in the absence of added hydrogen. These powerful dehydrogenation metals in amounts to exert any significant catalytic oxidative effect would be expected to dehydrogenate hydrocarbons, yielding unsaturates which are known to be coke precursors. Surprisingly, when the specified metals are added to FCC and TCC catalysts in amounts of 50 ppm or less, coke make is not significantly increased. Increase in coke make is tolerable up to less than 100 ppm of metal addition. At the lower levels of metal addition, hydrogen make, as measured by the "hydrogen factor" commonly employed in FCC, is slightly increased. Greater amounts of metal component within the scope of the invention raise the hydrogen factor, but within tolerable limits. Hence, the addition of from trace amounts up to less than 100 ppm of the said metal component is within the scope of this invention. Preferable catalysts are produced by addition of 0.1 to 50 ppm of metal.

For the purpose of this invention, the terms "metal component" or "added metal component" shall mean either the metal itself or a metal ion or a metal compound, such as the oxide, sulfide, halide, sulfate, or other combined form resulting from adding the metal or metal compound to the catalyst.

DESCRIPTION OF SPECIFIC EMBODIMENTS

The catalyst of this invention containing the added metal component shows particularly spectacular reductions in CO content of flue gases from FCC units as evidenced by an improved $CO_2/CO$ ratio over the cracking catalyst containing no added metal component. The metal components are of particular benefit in catalysts containing silica, alumina, magnesia, zirconia, clay and combinations thereof. They are found to be of particular benefit in a composite catalyst of active crystalline aluminosilicate zeolites in a porous matrix, such as a clay-derived matrix. Other types of matrices include silica, alumina, magnesia, zirconia, and mixtures of these.

The metal component may be incorporated into the catalyst by impregnation, by ion exchange or by other means by contacting either the catalyst or a component thereof with a solution of a compound of the metal in an appropriate amount necessary to provide the desired concentration within the scope of the invention. The metal component may be incorporated either in any step during preparation of the catalyst or after the finished catalyst has been prepared. A preferred manner of incorporation is to ion-exchange a crystalline aluminosilicate and then compositing the ion-exchanged product with a porous matrix. Also useful is the ion-exchanging or impregnation of siliceous solids or clays. Suitable metal compounds include the metal halides, preferably chlorides, nitrates, ammine halides, oxides, sulfates, phosphates and other water-soluble inorganic salts; and also the metal carboxylates of from 1 to 5 carbon atoms, alcoholates. Specific examples include palladium chloride, chloroplatinic acid, ruthenium penta-ammine chloride, osmium chloride perrhenic acid, dioxobis(ethylenediamine)rhenium(V) chloride, rhodium chloride and the like.

Alternatively, an oil-soluble or oil-dispersable compound of the metal may be added in suitable amount to a hydrocarbon feedstock, such as a gas oil charge stock, for incorporation in the catalyst as the charge is cracked. Such compounds include metal diketonates, carbonyls, metallocenes, olefin complexes of 2 to 20 carbons, acetylene complexes, alkyl or aryl phosphine complexes and carboxylates of 1 to 20 carbons. Specific examples of these are platinum acetylacetonate, tris-(acetylacetonato)rhodium(III), triiodoiridium(III) tricarbonyl, $\pi$-cyclopentadienylrhenium(I) tricarbonyl, ruthenocene, $\pi$-cyclopentadienylosmium(I) dicarbonyl dimer, dichloro(ethylene)palladium(II) dimer, ($\pi$-cyclopentadienyl) (ethylene)rhodium(I), diphenylacetylenebis(triphenylphosphino)platinum(O), bromomethylbis(triethylphosphino)palladium(II), tetrakis(triphenylphosphino)palladium(O), chlorocarbonylbis(triphenylphosphino)iridium(I), palladium acetate, and palladium naphthenate.

Regardless of the method of incorporating the metal component in the catalyst, improved results have been obtained.

The feedstocks which may be cracked using the catalysts of this invention include any conventional hydrocarbon stocks, such as naphthas, gas oil, light and heavy distillates, residual oils and the like.

EXAMPLE 1

215 cc of an aqueous $Pd(NO_3)_2$ solution containing 0.0103 g Pd/liter were added to 222 g, bone dry basis, of a calcined RENaY containing 16.1 wt. % $RE_2O_3$ and 2.7 wt. % Na to provide 0.001 wt. % (10 ppm) Pd. The zeolite was calcined at 1200° F. for 1 hour. The zeolite (10 wt. %) was incorporated in a matrix (90 wt. %) consisting of 40 wt. % Georgia kaolin, 57.4 wt. % $SiO_2$, 0.6 wt. % $Al_2O_3$, and 2 wt. % $ZrO_2$ to provide 1 ppm palladium in the composite catalyst. The matrix was prepared by mixing water, kaolin, Q-Brand sodium silicate (28.9 wt. % $SiO_2$, 8.9 wt. % $Na_2O$, and 62.2 wt. % $H_2O$), aluminum sulfate, sodium zirconium sulfate, and sulfuric acid. The mixture was spray dried and the catalyst was exchanged with an aqueous 5 wt. % $(NH_4)_2SO_4$ solution, washed, and impregnated with an aqueous 7 wt. % $RECl_3.6H_2O$ solution. The catalyst was then dried in an oven at about 250° F. and a portion of it was steamed for 4 hours at 1400° F. and 0 psig, the heating to 1400° F. being carried out in a $N_2$ atmosphere.

EXAMPLE 2

215 cc of an aqueous $H_2PtCl_6$ solution containing 0.0103 g Pt/liter were added to another 222 g portion of the calcined RENaY of Example 1 to provide 10 ppm platinum. A catalyst was then prepared by the same procedure as in Example 1.

The cracking performances of the catalysts of Examples 1 and 2 were determined. A wide-cut Mid-Continent gas oil feedstock was cracked at 925° F. at a catalyst-to-oil ratio of 3 by wt., 8.3 WHSV, catalyst residence time 2.4 minutes; the results were:

| Catalyst (Example) | Ex. 1 | Ex. 2 | Blank* |
|---|---|---|---|
| Conversion, % vol. | 74.4 | 70.7 | 72.1 |
| $C_5+$ Gasoline, % vol. | 65.0 | 63.0 | 64.3 |
| Total $C_4$'s, % vol. | 14.4 | 12.6 | 13.3 |
| Dry Gas, % wt. | 6.4 | 5.6 | 5.6 |
| Coke, % wt. | 2.5 | 2.3 | 2.3 |
| Carbon on Cat., % wt. | 0.71 | 0.65 | 0.65 |
| Hydrogen Factor** | 39 | 27 | 30 |

*Catalyst without added metal component.
**100 × [moles $H_2$/moles $C_1 + C_2$]

The two catalysts were subjected to regeneration in two successive stages. The conditions of each stage of regeneration were as follows: Air was passed over the catalyst at a rate of 25 cc/min./gram of catalyst at 1000° F. and atmospheric pressure for 8 minutes, and the gas was collected.

The results were as follows:

| | Ex. 1 | Ex. 2 | Blank* |
|---|---|---|---|
| First Stage | | | |
| $CO_2$, mol % | 3.5 | 5.2 | 4.0 |
| CO, mol % | 2.7 | 0 | 3.2 |
| $CO_2/CO$ | 1.3 | ∞ | 1.3 |
| Initial Carbon, % wt. | 0.71 | 0.65 | — |
| Final Carbon, % wt. | 0.42 | 0.43 | — |
| Second Stage | | | |
| $CO_2$, mol % | 2.0 | 2.7 | 2.4 |
| CO, mol % | 1.2 | 0 | 1.7 |
| $CO_2/CO$ | 1.7 | ∞ | 1.4 |
| Initial Carbon, % wt. | 0.42 | 0.43 | — |
| Final Carbon, % wt. | 0.28 | 0.26 | — |

*Catalyst without metal component.

EXAMPLE 3

An RENaY (222 g) was prepared in the same manner as in Example 1, except that it was uncalcined. Thereafter, 163 cc of an aqueous $H_2PtCl_6$ solution containing 0.0137 g Pt/liter were added to provide 0.001 wt. % (10 ppm) platinum. A composite catalyst containing 1 ppm platinum was then prepared by the same procedure as in Example 1.

Cracking data, using the same feedstock as in the previous examples and under the same conditions, and regeneration data under the same conditions as in the previous examples were as follows:

| Catalyst | Ex. 3 | Blank |
|---|---|---|
| Conversion, % vol. | 76.2 | 74.4 |
| Coke, % wt. | 3.0 | 2.4 |
| Carbon on Cat., % wt. | 0.84 | 0.69 |
| Hydrogen Factor | 29 | 17 |

-continued

| Regeneration | Stage 1 | Stage 1 |
|---|---|---|
| $CO_2$, mol % | 8.3 | 3.3 |
| CO, mol % | 0.6 | 3.0 |
| $CO_2/CO$ | 13 | 1.1 |
| Final C, % wt. | 0.56 | 0.56 |
| | Stage 2 | Stage 2 |
| $CO_2$, mol % | 4.7 | 1.6 |
| CO, mol % | ≦0.1 | 1.4 |
| $CO_2/CO$ | ≧47 | 1.1 |
| Final C, % wt. | 0.44 | — |

The increased $CO_2/CO$ mole ratio with the presence of only 1 ppm of platinum clearly illustrates the advantage of the metal component in the catalysts of this invention.

EXAMPLE 4

A rare-earth exchanged zeolite Y (15.8 wt. % $RE_2O_3$, 2.7% Na) was slurried with an aqueous solution containing $[Pt(NH_3)_6]Cl_4$. The resulting platinum-containing zeolite was filtered, dried at 250° F., and calcined at 1200° F. for one hour. The resulting zeolite was incorporated in a matrix as described in Example 1 to give a finished cracking catalyst containing 10% of the zeolite by weight to which 1 ppm platinum had been added. A blank catalyst was prepared similarly, the $[Pt(NH_3)_6]Cl_4$ being eliminated from the zeolite slurry.

Both catalysts were heated to 1400° F. and steamed as in Example 1, used to crack the feedstock of Example 1 and regenerated under the conditions of Example 2. The results were as follows:

| | Ex. 4 | Blank |
|---|---|---|
| Conversion, % vol. | 76.1 | 73.9 |
| Coke, % wt. | 2.8 | 2.5 |
| Carbon on Cat., % wt. | 0.82 | 0.73 |
| Hydrogen Factor | 19 | 16 |

| Regeneration | Stage 1 | Stage 1 |
|---|---|---|
| $CO_2$, % mol | 5.9 | 3.3 |
| CO, % mol | 0.15 | 1.7 |
| $CO_2/CO$ | 39 | 1.9 |

EXAMPLE 5

A commercial cracking catalyst consisting of 15% REY and 85% matrix of 57.4% silica, 0.6% alumina, 40% clay and 2.0% zirconia, which had been spray dried, exchanged with ammonium nitrate and water-washed, was slurried with an aqueous solution of rare earth chloride and $Pt(NH_3)_4Cl_2$ sufficient to provide 3% $RE_2O_3$ and 2 ppm platinum to the finished catalyst. The catalyst was spray dried, heated in nitrogen, then steamed for 4 hours at 1400° F. A blank catalyst without platinum was prepared and treated similarly, $Pt(NH_3)_4Cl_2$ being omitted from the slurry.

Both catalysts were used to crack the same feedstock as in Example 2 and regenerated under the conditions of Example 2. The results were as follows:

| | Ex. 5 | Blank |
|---|---|---|
| Conversion, % vol. | 79.5 | 78.8 |
| Coke, % wt. | 3.3 | 3.1 |
| Carbon on Cat., % wt. | 0.945 | 0.884 |
| Hydrogen Factor | 15.8 | 12.1 |
| Regeneration | Stage 1 | Stage 1 |
| $CO_2$, mol % | 8.2 | 4.2 |
| CO, mol % | 1.2 | 3.4 |
| $CO_2/CO$ | 6.8 | 1.2 |
| | Stage 2 | |
| $CO_2$, mol % | 5.7 | |
| CO, mol % | 0.25 | |
| $CO_2/CO$ | 23 | |

EXAMPLE 6

A number of metals of the platinum group and rhenium were used to treat a catalyst containing 15% REY silica-alumina-clay-zirconia matrix (similar to that of Example 5). Solutions of the metal salts of appropriate concentration were added to the catalyst until it was wet. The finished catalyst was dried at 250° F. for 24 hours, heated in nitrogen at 1400° F. over 3½ hours and steamed for 4 hours. The metal salts were the chlorides of iridium, osmium and rhodium, and $[Ru(NH_3)_5Cl_2]Cl_2$, rhenium di(ethylene diamine) dioxide chloride, $Pt(NH_3)_4Cl_4$ and $Pd(NO_3)_2$. A total amount of metal equal to 3 ppm was so supplied. After the cracking of a wide-cut Mid-Continent gas oil feed and regeneration studies as in Example 2, the following results were obtained:

| Regeneration | | | | | | | | | |
|---|---|---|---|---|---|---|---|---|---|
| Stage 1 | Blank | Pt | Ir | Os | Pd | Rh | Ru | Re | Pt + Re* |
| $CO_2$, % mol | 3.8 | 7.1 | 5.7 | 4.2 | 4.6 | 4.9 | 4.5 | 3.8 | 4.6 |
| CO, % mol | 3.7 | 0.15 | 0.3 | 2.8 | 1.15 | 1.2 | 2.8 | 3.5 | 3.1 |
| $CO_2/CO$ | 1.0 | 47 | 19 | 1.5 | 4.0 | 4.0 | 1.6 | 1.1 | 1.5 |
| Stage 2 | Blank | Pt | Ir | Os | Pd | Rh | Ru | Re | Pt + Re* |
| $CO_2$, % mol | — | — | — | 2.0 | — | 2.7 | 3.5 | 2.7 | — |
| CO, % mol | — | — | — | 1.65 | — | 0.7 | 1.0 | 1.4 | — |
| $CO_2/CO$ | — | — | — | 1.2 | — | 3.9 | 3.5 | 1.9 | — |

*Made from $H_2PtCl_6$ and $HReO_4$ to provide 1.5 ppm of each metal.

EXAMPLE 7

In this example, equilibrium catalyst withdrawn from a commercial FCC unit was used. A wide-cut Mid-Continent gas oil stock was cracked at 929° F., 3 catalyst-oil ratio ratio, 2.4 minute catalyst residence time. The catalyst was regenerated in place in 2 stages under the conditions of Example 2. Then, the same gas oil, but now containing platinum acetylacetonate dissolved therein in sufficient quantity to provide 1 ppm platinum on the catalyst, was introduced into the cracker at the same conditions, except slightly higher temperature. The catalyst was regenerated again. Then the platinum-containing feed was again cracked over the same catalyst, and again the catalyst was regenerated. The following results were obtained:

| Cracking Feed | Gas Oil | Gas Oil & Pt | Gas Oil & Pt |
| --- | --- | --- | --- |
| Cycle | 1 | 2 | 3 |
| Temperature, °F. | 929 | 936 | 926 |
| Conversion, % vol. | 56.5 | 57.3 | 50.4 |
| Coke, % wt. | 2.3 | 2.4 | 2.3 |
| Carbon on Cat., % wt. | 0.67 | 0.67 | 0.67 |
| Hydrogen Factor | 25 | 29 | 31 |
| Regeneration | Stage 1 | | |
| $CO_2$, % mol | 3.2 | 5.1 | 5.6 |
| CO, % mol | 2.7 | 0.18 | 0.10 |
| $CO_2/CO$ | 1.2 | 28 | 56 |
| Estimated Pt on Catalyst at end of Cycle, ppm | 0 | 1 | 2 |

EXAMPLE 8

A commercial amorphous silica-alumina fluid cracking catalyst consisting of 13% $Al_2O_3$, 87% $SiO_2$ was impregnated with an aqueous solution of $Pt(NH_3)_4Cl_2$, oven-dried at 250° F., then heated and steamed at 1400° F. as in Example 1. The amount of platinum compound supplied was equivalent to 3 ppm of the metal. The catalyst without metal addition (blank), similarly treated, and the platinum-containing catalyst were used in the fluid cracking of the Mid-Continent gas oil stock, and then regenerated under the conditions of Example 2. The results were as follows:

| Catalyst | Ex. 8 | Blank |
| --- | --- | --- |
| Conversion, % vol. | 35.8 | 35.6 |
| Coke, % wt. | 1.82 | 1.54 |
| Carbon on Cat., % wt. | 0.52 | 0.44 |
| Regeneration | Stage 1 | |
| $CO_2$, % mol | 4.8 | 2.2 |
| CO, % mol | ≦0.05 | 1.2 |
| $CO_2/CO$ | ≧96 | 1.8 |

EXAMPLE 9

Moving bed catalysts are also improved by the presence of the added metal component of this invention. (a) A blank catalyst was prepared by incorporating 7.5% of the calcined rare-earth exchanged zeolite Y of Example 4 and 40% alumina fines in a silica-alumina matrix (93.6% $SiO_2$, 6.4% $Al_2O_3$) by the bead technique described in U.S. Pat. No. 3,140,249. After base-exchange and washing, the hydrogel beads were dried in pure steam of atmospheric pressure at 270° F. for 15 minutes, then at 340° F. for 15 minutes. The dried catalyst was finished by a 14-hour steam treatment at 1290° F. with 100% steam at atmospheric pressure. This blank catalyst was used in static bed cracking of a Mid-Continent gas oil at 875° F., a liquid hourly space velocity of 3 and a catalyst/oil ratio of 2 with 10 minutes on stream. The spent catalyst was regenerated and the $CO_2/CO$ ratio determined. (b) Rare-earth exchanged zeolite Y filter cake, 1530.6 g, containing 49.0% = 750 g of solids, was mulled with 160 cc of a $H_2PtCl_6$ solution containing 10.03 mg of Pt until uniform, then dried at 250° F. and calcined at 1200° F. for 3 hours. The product contained 13.4 ppm of platinum designed to provide 1 ppm of platinum to the catalyst after combination with the matrix. The preparation of the catalyst was completed as above. (c) The blank zeolite-matrix bead hydrogel was treated for 1 hour with sufficient $Pt(NH_3)_4Cl_2$ solution to supply 1 ppm of platinum based on the finished catalyst. (d) The calcined zeolite of paragraph (a) was used to prepare a catalyst similar to that described in (a) except that the matrix contained about 2200 ppm of cogelled $Cr_2O_3$.

These catalysts were also used in cracking the said feedstock at the same conditions, and were regenerated at the conditions of Example 2. The following results were obtained:

| Catalyst | (a) | (b) | (c) | (d) |
| --- | --- | --- | --- | --- |
| Conversion, % vol. | 68.8 | 69.3 | 70.4 | 70.9 |
| Coke, % wt. | 2.9 | 3.2 | 3.1 | 3.2 |
| Regeneration | | | | |
| $CO_2$, % mol | 5.5 | 7.3 | 8.3 | 5.4 |
| CO, % mol | 4.8 | 0.4 | 0.2 | 5.0 |
| $CO_2/CO$ | 1.1 | 18 | 42 | 1.1 |

EXAMPLE 10

A commercial clay-derived aluminosilicate zeolite cracking catalyst, containing about 55% by weight of alumina and about 45% by weight of silica and having an average particle size of between 58 and 64 microns, was employed in this example. A 1000 gram sample was mixed with 3500 cc of a solution containing 58.4 grams of $RECl_3.6H_2O$ and 2.7 mg of Pt as platinum tris(ethylene diamine) tetrachloride. After stirring for 30 minutes at 75° C. the catalyst was filtered out, water-washed and dried at 2500° F. The catalyst contained 3 ppm platinum and 3% by weight of rare earth oxide. Another sample of the same clay-derived catalyst ("Blank") was treated similarly, but without the platinum although with a slightly higher rare earth concentration present in the solution. The final catalyst contained 4.2% by weight of rare earth oxide. Both catalysts were steamed and tested for cracking performance as in Example 2.

A portion of each coked catalyst from the test was blended with uncoked steamed catalyst so that the carbon level of the mixture was 0.65% by weight. Regeneration was conducted at 1340° F. and atmospheric pressuring using 1.38 moles of oxygen per mole of carbon and the gas was collected. The following data were obtained:

| Regeneration | Ex. 10 | Blank |
| --- | --- | --- |
| $CO_2$, % mol | 9.1 | 7.6 |
| CO, % mol | 0.3 | 3.6 |
| $CO_2/CO$ | 30 | 2.1 |

EXAMPLE 11

The catalyst of Example 4, contaning 1 ppm of platinum was calcined at 1200° F. in $N_2$ for 3 hours. A wide-cut Mid-Continent gas oil feedstock was cracked over this catalyst at 910° F. at a catalyst to oil ratio of 2.0 by weight, 12.5 WHSV and catalyst residence time of 2.4 minutes.

The coked catalyst from this run was blended in various concentrations with an equilibrium commercial zeolitic catalyst withdrawn from a commercial FCC unit. This catalyst which contained no platinum had been regenerated and then used to crack the same gas oil feedstock as in Example 1 under the same conditions.

The variously blended coked catalysts were regenerated under the same conditions as in Example 2. The results are as follows:

| Pt-Containing Catalyst in Blend, % by wt. | Estimated Pt in Blend, ppm | $CO_2$ % mol | CO % mol | $CO_2/CO$ |
|---|---|---|---|---|
| 0 | 0 | 5.7 | 5.0 | 1.1 |
| 1 | 0.01 | 4.6 | 2.4 | 1.8 |
| 2 | 0.02 | 4.8 | 2.4 | 1.9 |
| 4 | 0.04 | 4.4 | 2.3 | 1.9 |
| 20 | 0.20 | 6.7 | 0.6 | 11 |
| 50 | 0.50 | 6.1 | 0.68 | 9.0 |
| 100 | 1.0 | 8.1 | 1.3 | 6.2 |

This experiment indicates that even at concentrations as low as 0.01 ppm of added metal component, the $CO_2/CO$ ratio is increased during regeneration.

The catalyst with added metal component may even contain an amount of metal component greater than that of the ultimate cracking catalyst mixture, such as for example but not necessarily 100 ppm, provided that either in the use of the catalyst for cracking or in the regeneration of used catalyst it is blended with cracking catalyst containing less or no metal component at sufficient concentrations to reduce the total added metal component to a concentration below 100 ppm.

It may thus be seen from the results of the cracking operations and subsequent regeneration data that the catalysts of this invention are just as effective in hydrocarbon conversion as conventional cracking catalysts. However, in the regeneration step, the $CO_2/CO$ effluent ratios are extraordinarily higher than catalysts without the added metal component. The type of catalyst, feedstock or manner of introducing the new component do not destroy the effectiveness in regeneration efficiency.

What is claimed is:

1. A solid, acid, porous hydrocarbon cracking catalyst that contains about 0.01 to 100 parts per million, based on said catalyst, of at least one metal of the group consisting of platinum, palladium, iridium, osmium, rhodium, ruthenium and rhenium in a form inherently capable of dehydrogenating gas oil; which catalyst has substantial activity to catalyze the endothermic cracking, in a cracking zone, of gas oil boiling range hydrocarbons at elevated temperatures and in the absence of added hydrogen, with concomitant deactivation during said cracking by reason of the deposition of coke thereon, in an amount not substantially higher than the amount of coke, based upon feed, which would have been deposited on said catalyst under the same operating conditions in the absence of said incorporated metal; which catalyst in its coked condition is adapted to be transported to a regeneration zone and therein, in combination with sufficient oxygen, to be exothermically regenerated and heated by burning coke thereoff to produce a heated, reactivated catalyst and a flue gas having a higher ratio of carbon dioxide to carbon monoxide than said flue gas would have using said catalyst without said metal; and which heated, reactivated catalyst is adapted to be returned to said cracking zone.

2. The cracking catalyst article claimed in claim 1 containing up to about 50 ppm of said metal.

3. The cracking catalyst article claimed in claim 1 having a particle size such that it is suitable for use in fluid cracking.

4. The cracking catalyst article claimed in claim 1 having a particle size such that it is suitable for use in Thermoform Catalytic Cracking (TCC).

5. The cracking catalyst claimed in claim 3 having an average particle size of about 10 to 100 microns.

6. The cracking catalyst claimed in claim 1 wherein said incorporated metal is iridium.

7. The cracking catalyst claimed in claim 1 wherein said incorporated metal is osmium.

8. The cracking catalyst claimed in claim 1 wherein said incorporated metal is palladium.

9. The cracking catalyst claimed in claim 1 wherein said incorporated metal is rhodium.

10. The cracking catalyst claimed in claim 1 wherein said incorporated metal is ruthenium.

11. The cracking catalyst claimed in claim 1 wherein said incorporated metal is rhenium.

12. The cracking catalyst claimed in claim 5, the major portion of which consists essentially of an acidic, amorphous, porous, solid gas oil cracking catalyst.

13. The catalyst of claim 1 wherein individual cracking catalyst particles contain an amount of metal component greater than that of the ultimate cracking catalyst mixture, providing that said particles are admixed with cracking catalyst particles containing less or no metal component, such that said ultimate cracking catalyst mixture contains less than 100 ppm of metal component.

14. The catalyst claimed in claim 13 containing up to about 10 part per million platinum based upon total cracking catalyst.

15. The catalyst claimed in claim 13 containing about 1 to 2 parts per million platinum based upon total cracking catalyst.

16. A gas oil cracking catalyst composition comprising a finely divided crystalline aluminosilicate zeolite having a structure of rigid three dimensional networks characterized by uniform pores suspended in and distributed throughout an inorganic oxide matrix, which composition has a sodium content of less than about 1 weight percent and contains about 0.01 to 100 parts per million, based on said catalyst, of at least one metal of the group consisting of platinum, palladium, iridium, osmium, rhodium, ruthenium, and rhenium in a form such that said metal is inherently capable of dehydrogenating gas oil but, because of its concentration does not substantially adversely affect the cracking reaction while still effectively catalyzing the oxidation of carbon monoxide to carbon dioxide when said catalyst is used in the catalytic cracking of gas oil in FCC or moving bed operations.

17. The composition of claim 16 containing up to about 50 ppm of said metal.

18. The composition of claim 16 containing up to 10 ppm of said metal.

19. The composition of claim 16, wherein said zeolite is rare earth exchanged zeolite Y.

20. The composition of claim 17, wherein said zeolite is rare earth exchanged zeolite Y.

21. The composition of claim 18, wherein said zeolite is rare earth exchanged zeolite Y.

22. The composition of claim 16, wherein said metal is platinum.

23. The composition of claim 17, wherein said metal is platinum.

24. The composition of claim 19, wherein said metal is platinum.

25. The composition of claim 20, wherein said metal is platinum.

26. The composition of claim 21, wherein said metal is platinum.

27. The composition of claim 26, wherein platinum is present in about 1 to 2 parts per million.

28. The composition of claim 18 wherein said metal is platinum.

* * * * *